(12) United States Patent
Falconetti et al.

(10) Patent No.: US 9,107,107 B2
(45) Date of Patent: Aug. 11, 2015

(54) METHOD AND DEVICE FOR SELECTION OF MOBILE STATIONS IN COORDINATED MULTIPOINT TRANSMISSION

(75) Inventors: Laetitia Falconetti, Aachen (DE); Christian Hoymann, Aachen (DE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 240 days.

(21) Appl. No.: 13/319,644

(22) PCT Filed: Oct. 16, 2009

(86) PCT No.: PCT/EP2009/007457
§ 371 (c)(1),
(2), (4) Date: Jan. 17, 2012

(87) PCT Pub. No.: WO2010/130277
PCT Pub. Date: Nov. 18, 2010

(65) Prior Publication Data
US 2012/0184322 A1 Jul. 19, 2012

(30) Foreign Application Priority Data

May 11, 2009 (EP) .................... PCT/EP2009/003327

(51) Int. Cl.
*H04W 24/02* (2009.01)
*H04W 28/16* (2009.01)
*H04W 28/18* (2009.01)

(52) U.S. Cl.
CPC .............. *H04W 28/16* (2013.01); *H04W 28/18* (2013.01)

(58) Field of Classification Search
CPC ........... H04W 24/02; H04Q 7/20; H04B 7/02; H04B 17/02
USPC .................................. 455/9, 524, 67.11, 522
See application file for complete search history.

(56) References Cited

U.S. PATENT DOCUMENTS

| | | | |
|---|---|---|---|
| 2005/0085254 A1* | 4/2005 | Chuah et al. | 455/522 |
| 2008/0207117 A1* | 8/2008 | Lim et al. | 455/9 |
| 2011/0263271 A1* | 10/2011 | Hoymann et al. | 455/456.1 |

FOREIGN PATENT DOCUMENTS

| | | |
|---|---|---|
| WO | 2010034528 A1 | 4/2010 |
| WO | 2010124725 A1 | 11/2010 |
| WO | 2010130268 A1 | 11/2010 |

OTHER PUBLICATIONS

Andrews, J., et al., "Interference cancellation for cellular systems: a contemporary overview", IEEE Wireless Communications; Modulation, Coding, and Signal Processing for Wireless Communications, Apr. 1, 2005, pp. 19-29, IEEE.

(Continued)

*Primary Examiner* — Myron K Wyche
(74) *Attorney, Agent, or Firm* — Coats & Bennett, PLLC (57) ABSTRACT

A method of data transmission with a first mobile station (UE1) in a cellular communication system is described. The cellular communication system comprises a plurality of access nodes (BS1, BS2, BS3), and a plurality of mobile stations (UE11, UE2', UE3') in a coverage area (302) of the plurality of access nodes (BS1, BS2, BS3). The plurality of access nodes (BS1, BS2, BS3) and the plurality of mobile stations are adapted to perform data transmission in a first mode between an individual access node from the plurality of access nodes and the first mobile station (UE1), and in a second mode of cooperative data transmission between at least two of the access nodes from the plurality of access nodes and the first mobile station (UE1). The method comprises the steps of identifying the first mobile station (UE1) from the plurality of mobile stations, determining an indication of a modification of the transmission conditions between the first mode and the second mode for said first mobile station (UE1), selecting the mode of data transmission for the identified mobile station from the first and the second mode based on the indication, and performing the data transmission in the selected mode. A corresponding device and program is also described.

15 Claims, 8 Drawing Sheets

(56) References Cited

OTHER PUBLICATIONS

3rd Generation Partnership Project, "3rd Generation Partnership Project; Technical Specification Group Radio Access Network; Further Advancements for E-UTRA Physical Layer Aspects (Release 9)", Technical Report, 3GPP TR 36.814 V0.4.1, Feb. 1, 2009, pp. 1-31, 3GPP, France.

3rd Generation Partnership Project. "Coordinated multi-cell transmission for LTE-Advanced downlink." 3GPP TSG RAN WG1 Meeting #54, R1-082896, Jeju, South Korea, Aug. 18-22, 2008.

* cited by examiner

Fig. 3 coop. cell A    serving cell B    coop. cell C

METHOD AND DEVICE FOR SELECTION OF MOBILE STATIONS IN COORDINATED MULTIPOINT TRANSMISSION

TECHNICAL FIELD

The present invention relates to a method of data transmission with a mobile station in a cellular communication system. Devices and software programs embodying the invention are also described.

BACKGROUND

In cellular mobile communication networks, simultaneous transmission over air interfaces using the same physical resources frequently occurs. Thereby, co-channel interference is caused which reduces the signal quality of transmission signals measured e.g. as signal to interference and noise ratio (SINR). This in turn reduces the transmission capacity of the mobile communication network. Co-channel interference becomes even more critical in mobile communication networks having a dense deployment of access nodes.

Cooperation of access nodes is a possibility to increase the signal quality of transmission signals and the transmission capacity of a mobile communication network. For access node cooperation, an initial communication between an access node (a so called "serving access node") and a mobile station, also denoted as user equipment (UE), is extended in that the mobile station additionally communicates via at least one further access node (a so-called "supporting access node" or "cooperating access node"). Thereby, the serving access node additionally uses the transmission and receiving capacities of the at least one supporting access node for communicating with the mobile station.

For using the additional transmission and receiving capacities, user data, control data and data for operation and maintenance (O&M) has to be exchanged between the serving access node and the at least one supporting access node (e.g., via a core network). Different kinds of data may be exchanged for this purpose, for example decoded data, soft bits or I/Q data. In 3GPP ($3^{rd}$ Generation Partnership Project) LTE (Long Term Evolution), such an access node cooperation is denoted Coordinated Multi-Point Transmission and Reception (CoMP).

For simplicity the terms "cell" and "access node of a cell" or "base station of a cell" are generally used as synonyms throughout this text if it is clear that the term refers to the corresponding device while reference to the coverage area of the cell is generally indicated by additional terms like "cell edge", "cell shape" or "UEs within the cell".

In DL (Downlink, i.e. for transmissions towards a UE) CoMP of LTE, cooperating cells mitigate co-channel interference by means of coordinated scheduling, coordinated beam forming or joint transmission. Besides interference mitigating, cooperating cells transmit the same data to a UE when applying joint transmission. In order to do so the serving cell has to transfer the UE data to the cooperating cells in advance. In UL (Uplink, i.e. for transmissions from a UE) CoMP of LTE, a UE signal is received at different cells. Cooperating cells transfer the received signal, potentially after pre-processing, to the serving cell which jointly processes the received information.

In case of intra-site (intra-BS) CoMP cells or sectors of the same BS, i.e. the same site, are cooperating. The information exchange between cooperating cells is not performed through an external backhaul link but only between processing boards of the same BS (Base Station). In case of inter-site (inter-BS) CoMP cells of any BS (any site) may cooperate. The information exchange between cooperating cells is performed via a logical interface, e.g. the X2 interface for LTE, physically transmitted through the BS's backhaul link.

The computational complexity of joint reception and joint transmission algorithms increases with the number of UEs under cooperation. Consequently the hardware requirements of network nodes increase. Also the CoMP-related information exchange between cells increases with the number of UEs under cooperation. Consequently the capacity requirement of the network connecting cells increases or, with a given deployment, the probability of network overload. This is especially the case with inter-site CoMP.

In more detail, the transport links connecting the serving access node and the at least one supporting access node may not have sufficient transport link capacity for transmitting the required user data, control data and data for O&M between the serving access node and the at least one supporting access node. In case of distant access nodes, the transport link can, for example, be realized as a leased wired telephone line having a transport link capacity of about 2 Mbps, a wireless microwave link having a transport capacity of several tens of Mbps, a wired Digital Subscriber Line (DSL) connection having a transport capacity of several hundreds of Mbps, or a wired fiber connection having a transport capacity of several thousands of Mbps. In case of co-located access nodes, the transport link might, for example, be a computer bus running on the backplane of a server rack connecting two processing units. Due to the limited bandwidth of such or similar transport links, sometimes not sufficient user data, control data and data for O&M can be transported between the serving access node and the at least one supporting access node so that the access nodes cannot cooperate with each other.

Thus, for access nodes cooperating or intending to cooperate with each other in order to serve mobile stations, the problems of limited resources arise, e.g. limited transport link capacity on the network paths between the access nodes.

SUMMARY

It is an object of the present invention to obviate the above disadvantages and reduce problems due to resource limitations in case of cooperating access nodes.

According to the invention, this object is solved by a method and a device as described in the independent claims. The invention can also be embodied in a system and a program as described in the further independent claims. Further embodiments are described in the dependent claims.

A method of data transmission with a first mobile station in a cellular communication system is proposed. The cellular communication system comprises a plurality of access nodes, and a plurality of mobile stations in a coverage area of the plurality of access nodes. The plurality of access nodes and the plurality of mobile stations are adapted to perform data transmission in a first mode between an individual access node from the plurality of access nodes and the first mobile station, and in a second mode of cooperative data transmission between at least two of the access nodes from the plurality of access nodes and the first mobile station.

The method identifies the first mobile station from the plurality of mobile stations. An indication is determined of a modification of the transmission conditions between the first mode and the second mode for said first mobile station. Then the mode of data transmission for the identified mobile station is selected from the first and the second mode based on the indication. The data transmission is then performed in the selected mode.

With respect to a further aspect of the invention, a control device for a cellular communication system is described. The cellular communication system comprises a plurality of access nodes, and a plurality of mobile stations in a coverage area of the plurality of access nodes. The plurality of access nodes and the plurality of mobile stations are adapted to perform data transmission in a first mode between an individual access node from the plurality of access nodes and a first mobile station, and in a second mode of cooperative data transmission between at least two of the access nodes from the plurality of access nodes and the first mobile station.

The control device comprises an identification unit for identifying the first mobile station from the plurality of mobile stations. A reception interface is adapted for obtaining an indication of a modification of the transmission conditions between the first mode and the second mode for said first mobile station. A selector is adapted for selecting the mode of data transmission for the identified mobile station from the first and the second mode based on the indication. The control device comprises also a transmission interface for initiating an instruction to perform data transmission in the selected mode.

A program according to the invention is for example stored on a data carrier as a computer program product or it may be loadable into a processing system of an access node, e.g. as a sequence of signals. The program comprises program code portions for performing one or more of the steps of one or more of the method aspects described herein when the computer program product is executed on one or more computing devices. The computer program product may be stored on a computer-readable recording medium such as a permanent or re-writeable memory, a CD-ROM, or a DVD. The computer program product may also be provided for download via one or more computer networks, such as the Internet, a cellular telecommunications network or a wireless or wired Local Area Network (LAN).

The foregoing and other objects, features and advantages of the present invention will become more apparent in the following detailed description of embodiments as illustrated in the accompanying drawings.

DETAILED DESCRIPTION

In the following, for purposes of explanation and not limitation, specific details are set forth, such as particular sequences of steps, components and configurations, in order to provide a thorough understanding of the present invention. It will be apparent to one skilled in the art that the present invention may be practiced in other embodiments that depart from these specific details. For example, while the embodiments will be described with reference to mobile communication networks and mobile stations which are working according to the 3GPP LTE standard, it will be apparent to the skilled person that the invention can also be practiced in context with mobile communication networks and mobile stations which are working in accordance with other mobile communication standards.

Various access node cooperation techniques exist. In one access node cooperation technique, access node cooperation is centrally controlled by a central controller. Another access node cooperation technique is based on a concept of distributed cooperation, whereby access nodes communicate directly via an access node-to-access node interface without central control. For 3GPP LTE mobile communication networks, centralized and decentralized access node cooperation schemes allowing an increase of the carrier and a decrease of the co-channel interference exist. For simplicity, the term CoMP as known in LTE is used in many examples instead of the general term access node cooperation. However, it should be understood that the corresponding examples are meant to illustrate a general access node cooperation unless explicitly indicated.

Moreover, those skilled in the art will appreciate that the functions and processes explained herein below may be implemented using software functioning in conjunction with a programmed microprocessor or with general purpose computers. It will also be appreciated that while the embodiments are primarily described in the form of methods and apparatuses, the invention may also be embodiment in a computer program product as well as in a system comprising a computer processor and a memory coupled to the processor, wherein the memory is encoded with one or more programs that may perform the functions disclosed herein.

Figure 1:
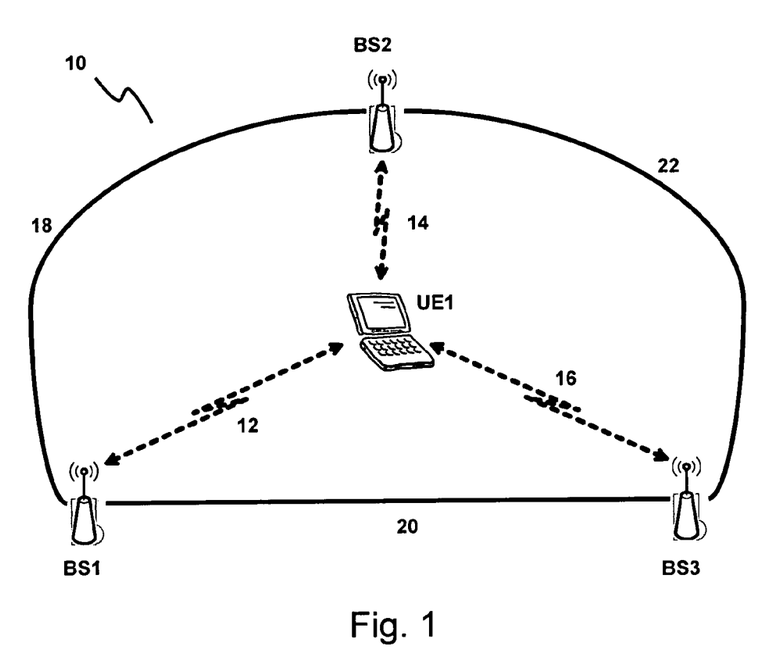
FIG. 1 is a schematic diagram showing a mobile communication network having a plurality of cooperating access nodes.

FIG. 1 shows a schematic block diagram illustrating an example of a mobile communication network having a plurality of cooperating access nodes. The mobile communication network 10 is for example a 3GPP LTE network and comprises two or more access nodes BS1, BS2 and BS3 which are communicating via air interfaces 12, 14, 16 with a mobile station UE1. It is to be understood that in general a plurality of mobile stations may be present. Access nodes BS1, BS2 and BS3 may for example be base stations or eNodeBs. Access node BS1 is a serving access node for mobile station UE1 and access nodes BS2 and BS3 are supporting access nodes. Access nodes BS1, BS2 and BS3 are cooperating with each other, i.e., serving access node BS1 is additionally using supporting access nodes BS2 and BS3 for communicating with mobile station UE1.

For the cooperation between access nodes BS1, BS2 and BS3, user data, control data and data for O&M can be exchanged between serving access node BS1 and supporting access nodes BS2 and BS3 via transport links 18, 20, 22. The achievable gain of access node cooperation generally depends on the amount of data that is exchanged between access nodes or between access nodes and a central controller. Generally speaking, the more information is exchanged between cooperating access nodes, the higher is the increase of the radio access network capacity. Transport links 18, 20, 22 are shown in FIG. 1 as direct connecting lines, however, the connections may also be provided via one or more intermediate network entities of, for example, a core network (not shown).

The mobile station or UE may be any mobile communication device or user equipment like a mobile telephone, a Personal Digital Assistant (PDA), a network card or any other mobile communication apparatus which is capable of communicating via an air interface with an access node.

The access node may be any kind of network component which is capable of communicating from the network side with a mobile station. The access node may constitute a cell, cover the cell area of the cell, and serve all mobile stations associated with the cell. The access node may for example be an eNodeB or a base station being deployed in a mobile communication network working according to the 3GPP LTE standard. The access node may also be a section of an eNodeB or a base station constituting a cell, in particular if a base station covers several sectors. Such a section may comprise one or more antennas, RF-parts such as filters, power-amplifiers and/or low-noise amplifiers, and signal processing means. Access node cooperation may be achieved via at least two access nodes, e.g., at least one of a first base station and a second base station, and a first section of a first base station and a second section of the same base station or a second base station. Base-station-to-base-station-cooperation may also be denoted as inter-base-station cooperation and section-to-section-cooperation of the same base station may also be denoted as intra-base-station cooperation. Accordingly, eNodeB-to-eNodeB-cooperation may also be denoted as inter-eNodeB cooperation and section-to-section-cooperation of the same eNodeB may also be denoted as intra-eNodeB cooperation.

Figure 2:
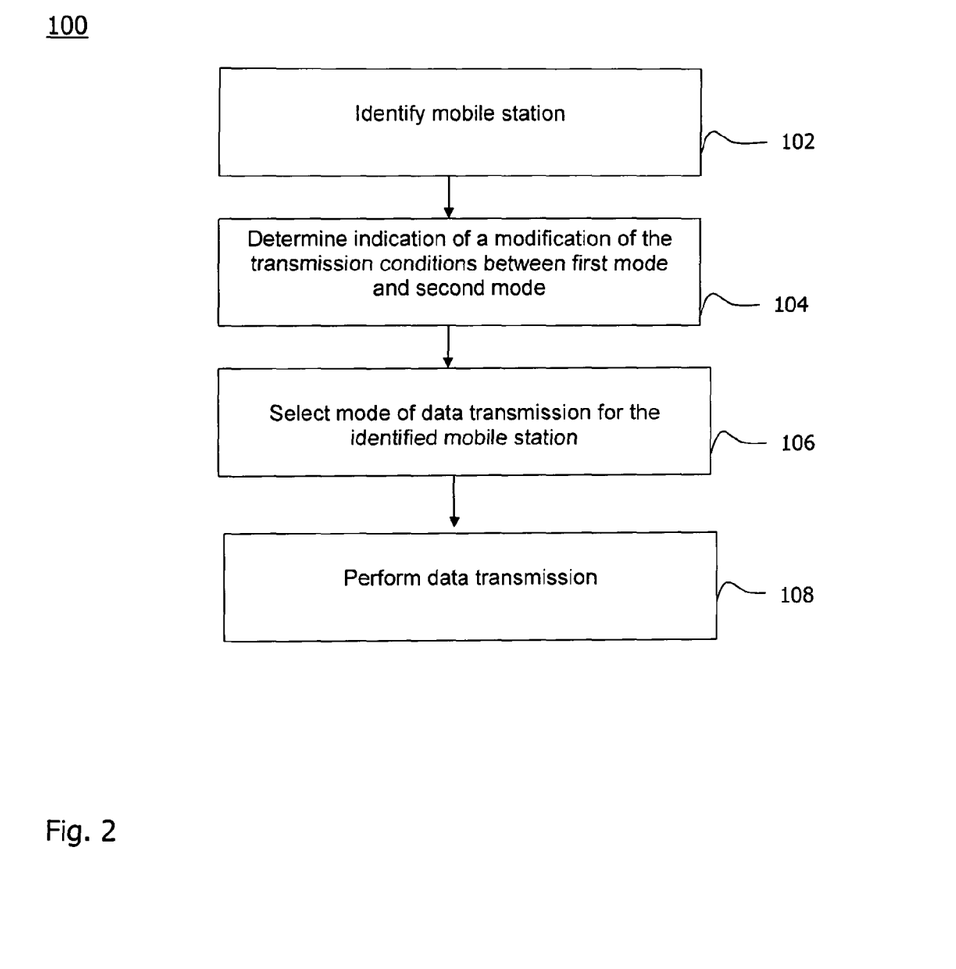
FIG. 2 is a flow chart illustrating a method according to the invention.
Figure 3:
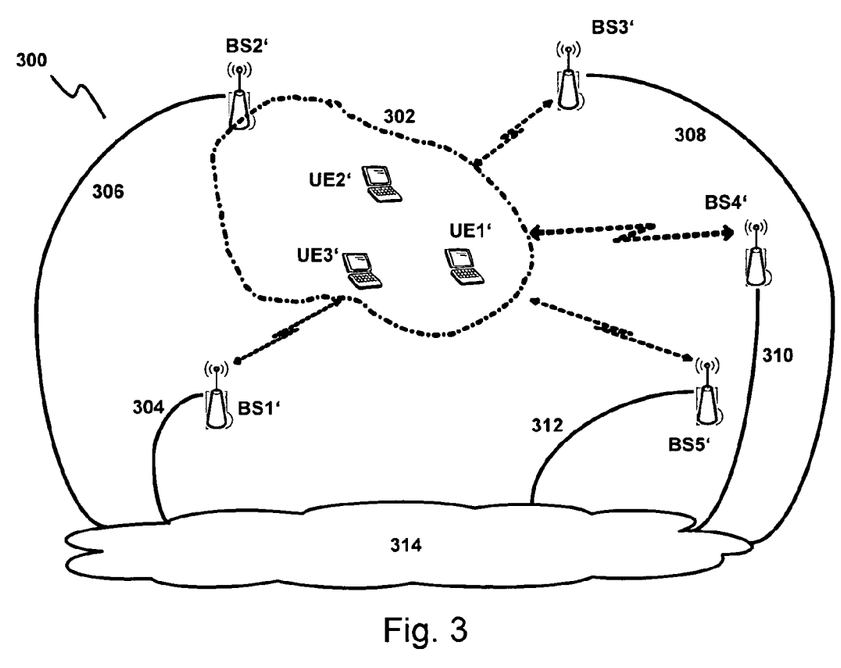
FIG. 3 is a schematic diagram showing a further example of a mobile communication network having a plurality of cooperating access nodes.

FIG. 2 shows a basic flow chart of a method which is in general terms performed in a cellular communication system comprising a plurality of access nodes, and a plurality of mobile stations in a coverage area of the plurality of access nodes, e.g. in a network as depicted in FIG. 1 or 3. The plurality of access nodes and the plurality of mobile stations are adapted to perform data transmission in a first mode between individual access nodes and the individual mobile stations, and in a second mode of cooperative data transmission between at least two of the access nodes and the individual mobile stations. The cooperative data transmission may be performed in DL only, or in UL only or both in UL and DL direction.

In a first step 102 of the method, a first mobile station is identified from the plurality of mobile stations. This step may be performed repeatedly for all mobile stations in the communication system or it may be triggered by particular events like a handover or operating conditions, e.g. bad radio conditions for the first mobile station. For the identified mobile station an indication is determined in step 104 which indicates a modification of the transmission conditions between the first mode and the second mode for said mobile station. For example a transmission quality can be estimated for the first and second mode for this purpose. A plurality of other examples is described below.

Based on the indication, the mode of data transmission is selected for the identified mobile station from the first and the second mode in step 106. It is possible that the second mode is further subdivided into different operating modes of cooperative transmission in which different amounts or kinds of data are exchanged between the access nodes. Finally, the data transmission is performed in step 108 in the selected mode. For example, the mobile station and/or serving and cooperating access nodes may receive an instruction to switch to the selected mode. An instruction to a mobile station can also be generated by an access node based on a received instruction. Instructions to a mobile station are generally only required for DL cooperation while UL cooperation of access nodes may also be transparent to the mobile station. The proposed method allows that not all mobile stations in the communication area are served in cooperative mode, which may either apply to uplink or downlink or both, but only selected mobile stations based on the indication.

In an embodiment of the method, a load threshold is determined for mobile stations in the second mode. The threshold may specify for example a maximum number or fraction of mobile stations in the second mode of transmission. If the threshold is reached, i.e. the load associated with all mobile stations selected for operation in the second mode is equal to or larger than the threshold, the first mode is selected for the mobile station identified for selection. In this way it can be avoided that more mobile stations are selected than link or capacity limitations allow.

The threshold can be associated with a specific access node from the plurality of access nodes. For example, it can be related to a maximum transport link load or a processing resource of the access node. In this case, also the load is associated with and determined for the specific access node. Consequently, limitations for each individual access node due to current operating conditions and available hardware, software and other resources can be considered.

It is possible to execute the method for more than one mobile station. In this case it can be beneficial to sort the identified mobile stations based on the indication, e.g. rank the mobile stations according to the potential improvement in transmission parameters when switching from the first mode to the cooperative mode. The step of selecting can then be performed for the sorted mobile stations, i.e. the mobile stations are selected based on their rank according to the sorting. In this way, the mobile stations with the most relevant indication are preferably selected for transmission in the cooperative mode.

The indication will in many cases relate to specific access nodes from the plurality of access nodes, e.g. to the presently serving access node and one or more presently or potentially cooperating access nodes. The plurality of access nodes can in general comprise at least one access node at a first location and at least one access node at a further location and more than one access node may be at one located at the same site. In this case, it can be advantageous to distinguish between co-sited and not co-sited access nodes, i.e. if intra- or inter-site cooperative transmission is performed, because inter-site cooperative transmission between access nodes at different sites affects the load due to data traffic on the links between the sites. In order to consider this load, the step of selecting can comprise a check if the location of the specific access nodes coincides.

As will be described in more detail for different embodiments below, the indication can for example be indicative of a difference in channel quality between a mobile station and different access nodes from the plurality of access nodes, a difference in signal propagation delay between a mobile station and different access nodes, possibly compared to a threshold for the difference in the signal propagation delay adjusted by a multi path propagation delay, a radio link performance between a mobile station and an access node from the plurality of access nodes, an absolute or relative difference between a throughput of the data transmission between the first mode and the second mode, a geographical location of the first mobile station, or a transmission requirement of an application executed in the first mobile station. The indication can comprise any combination of such parameters. In particular it is possible to execute a pre-selection according to a first one of these parameters and then select the mobile station for transmission in the cooperative mode according to one or more other parameters from the pre-selected mobile stations.

FIG. 3 shows a schematic block diagram illustrating a mobile communication network having a plurality of cooperating access nodes. Within the mobile communication network 300, five access nodes BS1', BS2', BS3', BS4' and BS5' are deployed. Access nodes BS1', BS2', BS3', BS4' and BS5' may for example be base stations or eNodeBs. Three mobile stations UE1', UE2' and UE3' are located in the coverage area 302 of access nodes BS1', BS2', BS3', BS4' and BS5'. Accordingly, the access nodes BS1', BS2', BS3', BS4' and BS5' are capable of communicating with each of mobile stations UE1', UE2' and UE3'.

Access nodes BS1', BS2', BS3', BS4' and BS5' may exchange via transport links 304, 306, 308, 310, 312 and core network 314 information regarding their backhaul and/or further capacities. Transport links 304, 306, 308, 310, 312 are the backhaul links of access nodes BS1', BS2', BS3', BS4' and BS5'. The information exchanged between the access nodes BS1', BS2', BS3', BS4' and BS5' can be information regarding the maximum transport link capacity of each access node BS1', BS2', BS3', BS4' and BS5', the type of transport links 304, 306, 308, 310, 312 employed (e.g., copper, optical fibre, microwave, or server backplane) and/or the current utilization of backhaul links 304, 306, 308, 310, 312 (e.g., measured in a percentage). Access nodes BS1', BS2', BS3', BS4' and BS5' may also exchange information regarding an amount of unused backhaul capacity (e.g., in Mbps). In the same way, the access nodes may also exchange information about further capacity limitations, e.g. a limited processing capacity or other resource limitations due to hardware or software capacity or on the air interface. Such limitations may be communicated in any way, e.g. as a maximum number of mobile stations which may be served in CoMP mode. It is also possible that information regarding whether the access nodes BS1', BS2', BS3', BS4' and BS5' are capable of cooperatively serving another mobile stations is exchanged (e.g., a single bit in a data packet may indicate whether an access node or transport link 304, 306, 308, 310, 312 is busy or not). The information may be exchanged as capacity measurement reports.

The information regarding capacities may be directly exchanged between access nodes BS1', BS2', BS3', BS4' and BS5' via transport links 304, 306, 308, 310, 312 and core network 314. For example, in case the mobile communication network 300 is a network working in accordance with the 3GPP LTE standard, the information may be exchanged via an X2 interface. However, the information may also be indirectly exchanged using a central controller or via an operation and maintenance system.

Mobile stations UE1', UE2' and UE3' typically determine radio link parameters, e.g. quality values of access nodes BS1', BS2', BS3', BS4' and BS5'. In particular, mobile stations UE1', UE2' and UE3' can determine radio link quality values for all access nodes BS1', BS2', BS3', BS4' and BS5' with which they are communicating. For this, mobile stations UE1', UE2' and UE3' carry out for example signal strength measurements. Thereafter, the mobile stations UE1', UE2' and UE3' send the determined radio link quality values to their respective serving access nodes.

In the following example it is assumed that access node BS2' performs a check with which mobile stations transmissions should be performed using access node cooperation or CoMP. Based on the parameters received from access nodes BS1', BS3', BS4' and BS5', access node BS2' determines that all mobile stations UE1', UE2' and UE3' would generally benefit from access node cooperation, i.e., the downlink and/or uplink capacity of mobile stations UE1', UE2' and UE3' could increase. However, the backhaul capacity of transport link 306 or the processing capacity of the access nodes, e.g. access node BS2', may be limited (i.e., not enough free transport link capacity is available) so that user data, control data and data for O&M data necessary for access node cooperation can be processed and/or sent to other access nodes only for a specific number of mobile stations.

One possibility to reduce the CoMP-related load and backhaul traffic is to limit the number of users in a cell that operate in CoMP mode. In this case UEs must be selected for CoMP support. If too many UEs are selected, the resulting requirements on the transport network increase, especially for inter-site CoMP. If unsuitable or too few UEs are selected the potential gain of CoMP is not fully exploited.

Several options are described below that can be used by a serving cell to select suitable UEs that will be served in the CoMP mode. Any of the following embodiments can be combined to leverage the advantages of different options. As outlined by some examples below. The optimized UE selection methods can be applied for intra-site and inter-site CoMP. Note that even though some embodiments are described with respect to DL or UL only, the presented options are applicable for both directions. In any embodiment, the number of UEs selected in the respective way may be set according to network-specific criteria such as the available backhaul capacity or any other limiting factor at the serving cell. A selection of UEs that are served in the CoMP mode can be used to optimize the performance gain of CoMP in view of the available resources and also simplify the implementation of CoMP because a limited capacity of links between cells or sites and the limited computational power of base stations can be considered.

First Embodiment

In a first embodiment UEs are selected based on the quality of at least one channel towards one or more cooperating cells relative to the quality of a channel towards the serving cell. For example, a UE can be selected if the quotient of the channel qualities or the difference of the (logarithmic) channel qualities is above or below a selected threshold. This allows selecting UEs that are located close to the cell edge or sector edge, e.g. in terms of SINR, which is not always the geographical edge. These UEs are usually suffering from high co-channel interference. The UE performance may or may not be considered, which is for instance also affected by the absolute channel quality towards the serving cell.

In particular, UEs can be selected in this way if they have relatively good channel conditions to one or more cooperating cells compared to the channel conditions to the serving cell. Those UEs may perceive high co-channel interference when not served in CoMP mode so that the gain due to interference mitigation is expected to be high. Also gain due to carrier signal aggregation is high when the strength of the aggregated signals is on a comparable order of magnitude.

Figure 4:
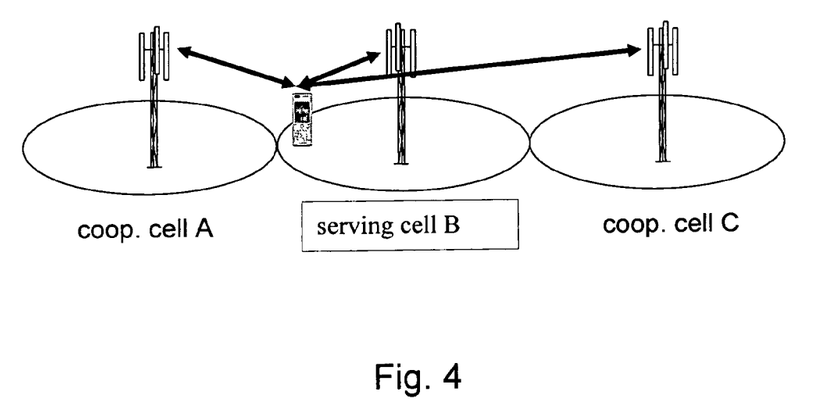
FIG. 4 shows a schematic example of serving and cooperating cells.

In the example of FIG. 4, a serving cell B considers the channel quality of the links between its UEs and the cooperating cells A, C in order to select appropriate UEs. Cell B can obtain DL measurements from the UE measurement reports.

In current systems, these measurements are commonly used for mobility purpose, e.g. to determine if a handover is required between different cells. UL measurements can be obtained directly by the network and be transmitted between different cells.

An example for a procedure of UE selection in this embodiment is the following:

1. UEs located in the area of cell B measure the channel quality from cooperating cells, e.g., measured as path gain or path loss, and report the measurements to their serving cell. In order to base the UE selection scheme on UL measurements, the BSs first exchange indications of the resources where UEs will transmit reference signals. Then, the BSs measure the channel quality on the indicated reference signals and exchange the measurement results.

In LTE systems, UEs report the path gain of cells falling into a range below the path gain of the serving cell. This range is either signalled by the serving cell or pre-defined.

2. The serving cell selects UEs based on relative channel quality. For instance it selects UEs measuring the path gain Pg from at least one cooperating cell within a certain range (x dB) below its own path gain to the UE. This is equivalent to $\Delta Pg = |Pg_{serving\ cell} - Pg_{cooperating\ cells}| < x$ dB, i.e. the difference of the logarithmic path gain is compared to a threshold. The path gain is just one exemplary measure characterizing the quality of the wireless channel. Other measures, e.g. the received signal strength, channel matrix Eigenvalues, overall link budget etc. can additionally or alternatively be considered in the same way.

3. Optionally, for example if the number of selected UEs is above a specified further threshold, the serving cell can adapt the number of CoMP UEs by adapting the threshold x, by selecting a fixed number of UEs according to the further threshold or by selecting a specified percentage of UEs with the lowest path gain difference $\Delta Pg$.

Figure 5:
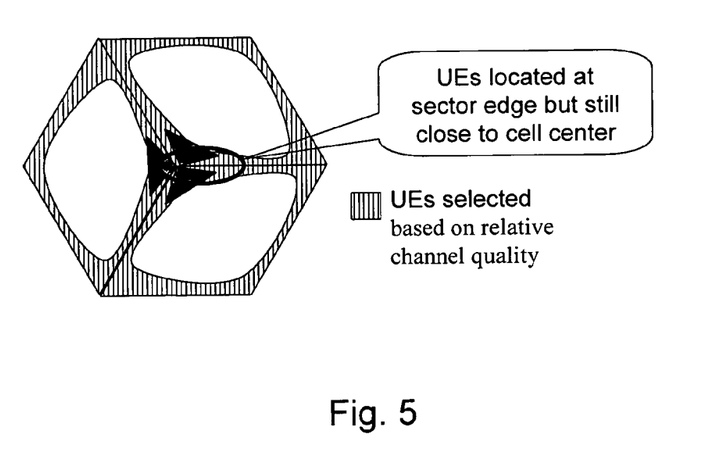
FIG. 5 shows a regional distribution of mobile stations selected according to a first embodiment of the invention.

In this embodiments UEs will generally be selected if located close to the cell/sector edge, see FIG. 5. It should be noted that the cell/sector edge is defined in this embodiment by equal carrier signal strength or equal SINR, which is not necessarily the geographical cell/sector edge as illustrated. UEs close to the cell edge usually receive signals of co-channel cells and of the serving cell with similar signal strength and benefit from the CoMP operation due to their good link with the cooperating cells.

In the above description UEs are selected independently of their absolute channel quality. While cell edge UEs typically suffer from high co-channel interference and low carrier signal strength this is not the case if UEs are located close to the BS of the cell at a sector edge, i.e. at the border between two cell sectors of the same site. These UEs are closer to the serving BS and perceive high carrier signal strength, see FIG. 5 in which the area from which UEs are preferably selected is marked by hatching.

As in also in the following FIGS. 6-9, the cells are indicated in FIG. 5 by a hexagonal shape comprising three sectors which are served by a central base station. The base station comprises three access nodes with antennas for the individual sectors as indicated by the shaded triangles in the centre of the cell. It should be noted that the representations of the cells in all Figures are highly schematic and the cell shapes and areas from which mobile stations are selected may deviate in practice, for instance due to topology of the area, buildings or vegetation and may vary also dynamically, e.g. due to weather conditions.

The following enhancement of the first embodiment distinguishes between cell and sector edges, i.e. between inter-site and intra-site CoMP. If the network allows for inter-site CoMP it may be useful to select UEs at cell edges, excluding UEs at sector edges, in order to reduce the number of UEs operating in CoMP mode and the traffic generated on the backhaul links between the sites. In this case, the second step in the aforementioned procedure can be modified to consider only cells of different sites:

$\Delta Pg = |Pg_{serving\ cell} - Pg_{cells\ of\ other\ sites}| < x$ dB.

If the network allows for intra-site CoMP only, it may be useful to select UEs at sector edges, excluding UEs at cell edges to neighbouring sites. Then, the second step in the aforementioned procedure can be modified to consider only sectors of the same site:

$\Delta Pg = |Pg_{serving\ cell} - Pg_{cells\ of\ same\ site}| < x$ dB.

Figure 6:
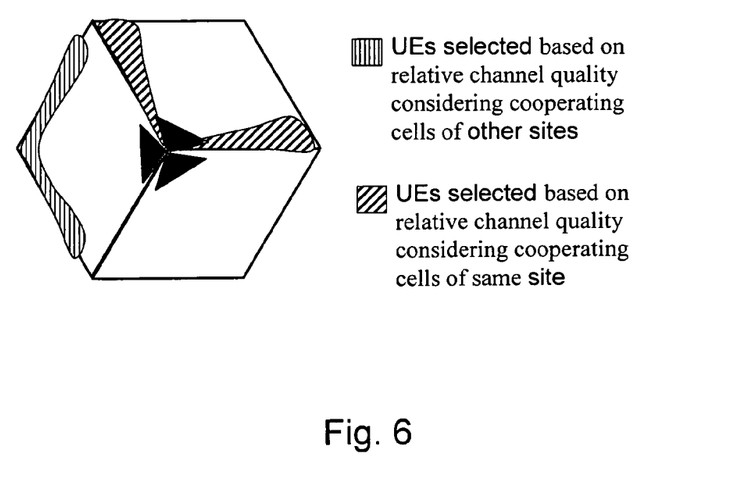
FIG. 6 shows a regional distribution of mobile stations selected according to a modified first embodiment of the invention.

If the network allows for intra- as well as inter-site CoMP, it may be useful to exclude UEs from inter-site CoMP that can already operate under intra-site CoMP. This enhancement reduces the CoMP-related backhaul traffic between different sites. Then the second step in the aforementioned procedure consists of two parts. In the first part UEs are selected for intra-site CoMP. In the second part, inter-site UEs selection is performed excluding UEs that are already served by intra-site CoMP. FIG. 6 shows the effect of the first embodiment optimised for inter- and intra-site CoMP.

The illustrated optimization for inter-site and intra-site CoMP by means of restricting the cooperating cells to cells of the same site or of different sites can as well be applied to the other embodiments below.

If UEs are selected in the first embodiment independently of their performance, the selected UEs are not necessarily the ones that require support most urgently. For instance, even if a particular UE has a relatively good channel towards a cooperating cell it might not perceive high interference and bad link performance because that cell is very empty, it is hardly using its resources and consequently it does not generate interference at all.

Second Embodiment

Two parameters that characterise channel conditions are signal propagation delay (SPD) and multi path propagation delay (MPD), also referred to as delay spread. The SPD refers to the length of time it takes for the signal to travel from the sender to the receiver. In order to maintain UL time synchronization of UEs with different SPD the BS usually assigns individual timing advances (TA) to UEs. Multi path propagation refers to radio signals reaching the receiving antenna by two or more different paths, leading to a time-dispersive channel and a frequency-selective channel frequency response. The difference in SPD of different paths is referred to as MPD.

OFDM (Orthogonal Frequency-Division Multiplexing) systems can cope with MPD by introducing a cyclic prefix. In cyclic-prefix insertion the last part of the OFDM symbol is copied and inserted at the beginning of the OFDM symbol. Cyclic-prefix insertion thus increases the length of the OFDM symbol by the length of the cyclic prefix with a corresponding reduction in the OFDM symbol rate. Without TAs and/or without sufficient cyclic prefix durations OFDM transmissions loose their inter-symbol and inter-carrier orthogonality leading to interference and performance degradation.

In CoMP systems the SPD between UEs and their serving and cooperating BSs is normally different. The difference cannot be handled by a TA because any TA is BS-specific. Also the MPD between UEs and their serving and cooperating BSs is different. These differences can be handled using the cyclic prefix. If the difference in SPDs and the corresponding MPDs fall within the length of the cyclic prefix, OFDM receivers can receive the cooperatively transmitted and jointly received signals without performance degradation. Otherwise the inter-symbol and inter-carrier interference degrades the performance or requires more complex receiver implementations.

In order to reduce implementation complexity and to maintain good performance in CoMP mode, UEs may be selected based on their timing relations. Correspondingly, also SPD and MPD may be considered alone or together with other indications, e.g. of the channel quality, in order to select mobile stations. An example for a corresponding second embodiment is the following:

1. UEs determine the timing differences ($\Delta T_i = SPD_{coop.\ cell\ i} - SPD_{serving\ cell}$) between the SPD of the serving cell and the SPDs of cooperating cells and report those to the serving BS. In addition the UE can determine the MPDs of the channels towards serving and cooperating cells from the frequency-selectivity of the channel frequency response and report that to the serving cell as well.

Alternatively the network, e.g. serving and cooperating BSs or a controller of these BSs, can measure the SPD and MPD. In order to do so BSs exchange information when and on which resources UEs transmit reference symbols. By measuring on those reference signals the BSs can derive the SPD and MPD. In particular, the cooperating BSs measure the difference in TA and SPD ($SPD_{coop.\ cell\ i} - TA_{serving\ cell}$). Finally, the BSs exchange their results.

2. The serving cell selects UEs based on SPD differences. For instance it may select UEs with an SPD difference to one cooperating BS smaller than the cyclic prefix duration CP, i.e. $|\Delta T_i| < CP$ or it may select UEs with an SPD difference to several or all potentially cooperating BSs smaller than the cyclic prefix duration, i.e. $\max(|\Delta T_i - \Delta T_j|, |\Delta T_i|) < CP$.

Considering also MPDs, the serving cell may select UEs with an SPD difference which is including the MPD smaller than the cyclic prefix duration, i.e. $|\Delta T_i| + MPD_i < CP$.

If a small degradation in receiver performance can be accepted the UE selection can even allow the SPD differences to exceed the CP duration to a certain extent, e.g. by x percent if $|\Delta T_i| < (1+x/100)*CP$.

Third Embodiment

In a third embodiment UEs are selected that have bad radio link performance. These UEs usually have bad absolute channel quality to the serving cell or very active co-channel cells generating much interference. The relative channel quality towards serving and cooperating cells or good channel quality towards cooperating cells may be but are not necessarily considered.

The third embodiment comprises identifying UEs experiencing bad radio link performance. This can, e.g., be done using SINR measurements. In LTE systems Channel Quality Indicators (CQI) are determined from such measurements and can also be used for the present purpose. Other performance indicators, such as number of ARQ (Automatic Repeat ReQuest)/HARQ (Hybrid Automatic Repeat ReQuest) retransmissions, modulation and coding scheme selected, average data rate, etc. can also be utilized to indicate the link performance.

An example for a procedure according to the third embodiment for UE selection is the following:

1. The serving cell acquires performance indications for different UEs.
   a. In UL the serving cell measures the performance, e.g., the SINR. Some CoMP modes require cooperating cells to measure the performance and to report it to the serving cell so that this information can be used in this case also for the present method.
   b. In DL the UE measures the performance, e.g., the SINR and reports it to the serving cell.
2. The serving cell sorts the served UEs based on their performance, potentially averaged in time and/or frequency, and selects UEs with worst radio link performance to operate in CoMP mode. The number of UEs selected in this way may be set according to other criteria such as the available backhaul capacity (or any other limiting factor) at the serving cell.

Figure 7:
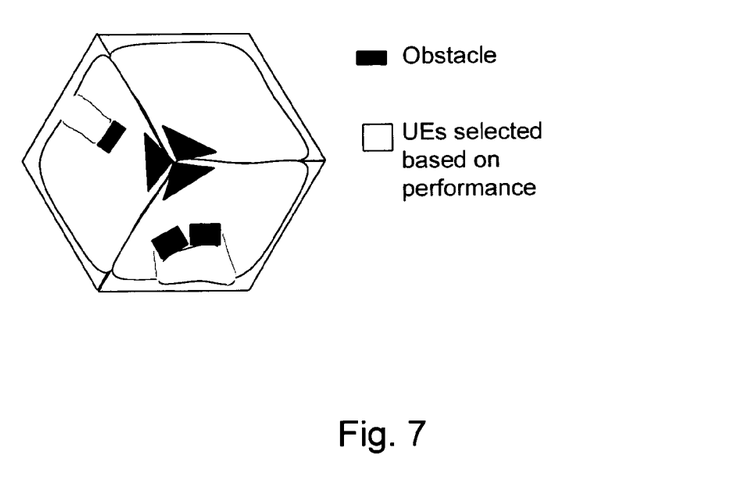
FIG. 7 shows a regional distribution of mobile stations selected according to a further embodiment of the invention.

Using the third embodiment, those UEs having the worst performance in the cell are supported by CoMP as illustrated by FIG. 7. In most cases the UEs with lowest performance include cell edge UEs located far from the serving cell's antennas, especially at cell edges towards highly active cells UEs located behind an obstacle that attenuates transmission with the serving cell, UEs experiencing a punctual channel fade.

Especially UEs close to the cell edges can thus exploit the potential of CoMP technology.

Fourth Embodiment

In a fourth embodiment UEs are selected if they would experience a large throughput increase due to CoMP, i.e. the fourth embodiment considers the difference of data throughput with and without CoMP. Depending on the parameters used to measure the throughput increase, this uses CoMP techniques to maximize network capacity. Signal conditions or signal performance can be but are not necessarily considered.

In the fourth embodiment the serving cell selects UEs which are expected to experience the largest throughput enhancement with CoMP. To estimate the throughput enhancement of users due to CoMP technology, the serving cell may estimate performance, e.g. in terms of SINR, CQI, MCS, throughput etc. for operation of individual UEs with and without CoMP.

An example for a procedure corresponding to the fourth embodiment is as follows:

1. The serving cell acquires two performance indications per UE, one measurement for the case without CoMP operation, i.e. data transmission with the serving cell only, and one measurement for the case of CoMP operation.
   a. In UL, the serving and cooperating cells can measure and estimate the performance. Depending on the CoMP mode, the supporting cells and the serving cell may exchange CoMP-related information.
   b. In DL, the UE can determine and estimates the performance for both the cases of CoMP and operation without CoMP and report the results to the serving cell.
2. Based on a comparison of the performance measurements for both cases, the serving cell can estimate the CoMP gain for every UE. The CoMP gain can for instance be expressed as the difference in the throughput without CoMP, $TP_{No\ CoMP}$, and the throughput with CoMP support, $TP_{CoMP}$. The serving cell can thus estimate the expected throughput enhancement in case this UE is served in CoMP mode, for example expressed in absolute value (e.g. in bits per second): $\Delta TP = TP_{CoMP} - TP_{No\ CoMP}$ or relative to the throughput without CoMP, i.e. $\Delta TP = (TP_{CoMP} - TP_{No\ CoMP}) TP_{No\ CoMP}$ 3. The serving cell selects those UEs with the largest throughput enhancement due to CoMP.

In particular if absolute values are used as metric for UE selection, the cell capacity can be increased to a maximum. UEs selected in this way are not necessarily located at cell edges and can have good throughput even without CoMP but may still benefit from CoMP due to a good link to co-channel cells.

The absolute throughput enhancement could be larger for those UEs than for UEs experiencing lower throughput in the cell. In order to favour cell edge UEs with low performance, relative increases can be considered.

Fifth Embodiment

In a fifth embodiment UEs are selected based on their geographical location. The location of a UE can be obtained by means of different techniques, e.g., triangulation, GPS measurements reported by the UE, proximity parameters obtained from network node measurements, pattern recognition, or by any other positioning service, e.g., as specified for 3GPP LTE. UEs may also be arbitrarily selected based on their position. For instance, the physical distance to the serving BS and/or to cooperating BSs, the shape of the cell, or known obstacles could be taken into account.

Sixth Embodiment

In a sixth embodiment UEs are selected to operate under CoMP mode based on service or application specific parameters. UEs in CoMP mode may perceive increased data rates at the expense of higher packet delays due to the required network coordination. Also the setup of the CoMP mode may take time. Consequently, CoMP is suitable in particular for services requiring large bit rates over a certain period of time, such as, e.g., file download, file sharing, video streaming, software updates, mailbox synchronization, backup processes, etc.

In order to perform a method according to the sixth embodiment, the serving cell obtains information on the application or service run by the UE. Such information could, e.g., be signaled during set-up of UE radio bearers and may in LTE be acquired from the QoS (Quality of Service) Class Indicator (QCI). Alternatively the BS could inspect IP packets trying to identify the application based on higher layer packet headers such as TCP, UDP or IP or another node in the packet flow could do such an inspection and signal it to the BS. The BS may also obtain buffer status reports of its own buffers (for DL CoMP) as well as buffer status reports issued by the UE (for UL CoMP) as indicator for large file uploads and downloads. As a still further alternative, the user subscription may be used to select UEs for CoMP, so that for example subscriptions offering high QoS are selected for CoMP mode with higher priority while UEs with low-cost subscriptions with low or without QoS are not selected. Such information can be provided by the core network. Also the long-term traffic pattern of UEs may indicate the service or application requirements and indicate whether to select a UE or not. Any of these indications may also be used in combination.

Combinations of the Above Embodiments

All of the aforementioned embodiments can be combined to leverage the respective advantages. As an example, a combined UE selection based on relative channel quality and radio link performance as described with respect to the first and third embodiments above is outlined in the following.

The combined UE selection comprises two parts.
1. UEs are identified based on relative channel quality. This part may e.g. identify a list of cell edge UEs although not all may need CoMP to experience a good throughput.
2. From the identified UEs a selection is then performed based on radio link performance. This ensures that only UEs with bad performance are supported by CoMP.

Figure 8:
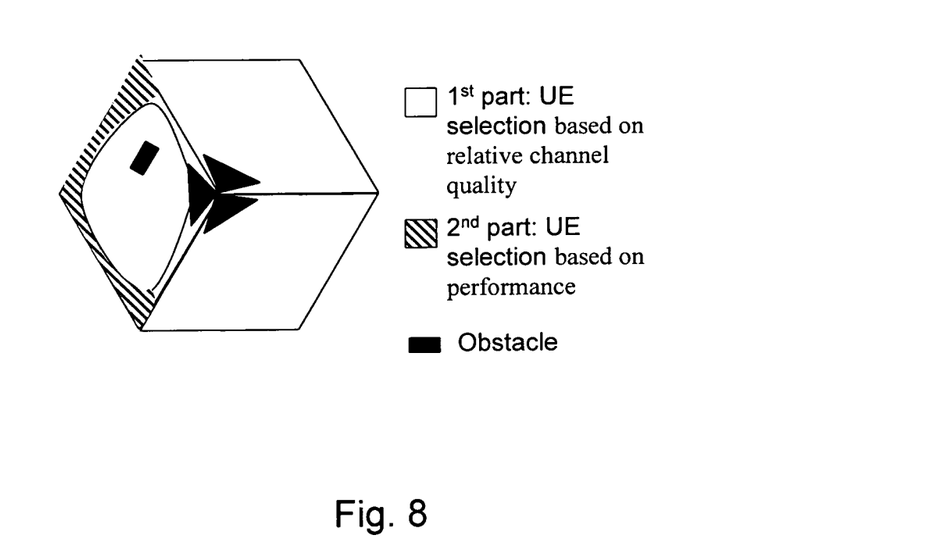
FIG. 8 shows a regional distribution of mobile stations selected according to a first combination of embodiments of the invention.

FIG. 8 illustrates the effect of such a UE selection allowing increased throughput of bad performing UEs located at cell or sector edges.

Figure 9:
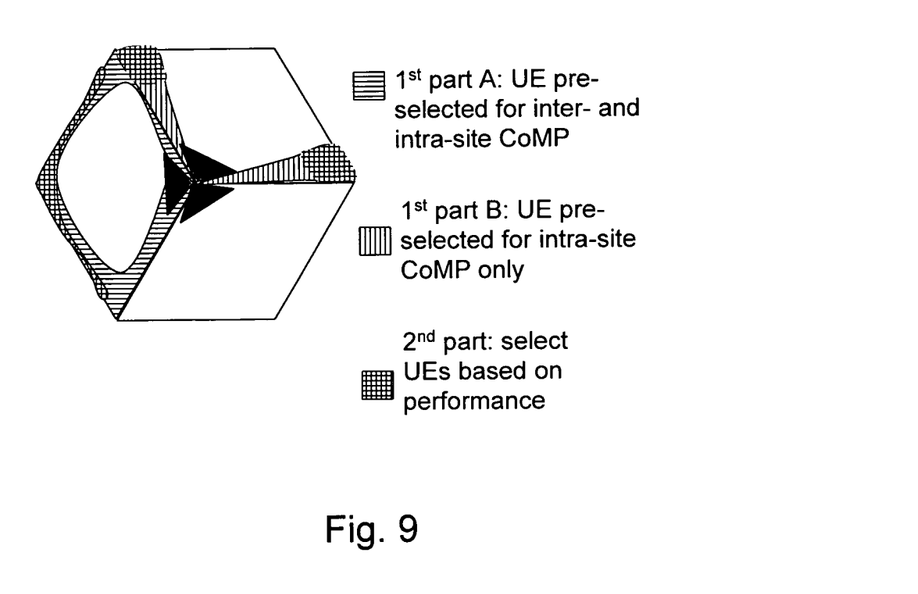
FIG. 9 shows a regional distribution of mobile stations selected according to a second combination of embodiments of the invention.

Another example for a combination of embodiments comprises optimizations described above for inter-site and intra-site CoMP. For intra-site CoMP, the relative channel quality is measured only for cells/sectors of the same site, and for inter-site CoMP only cells of a different site are considered. From the UEs pre-selected in this way the UEs are then selected based on radio link performance criteria, FIG. 9 illustrates such a combined UE selection optimised for inter-site or intra-site CoMP.

Further Example

Figure 10:
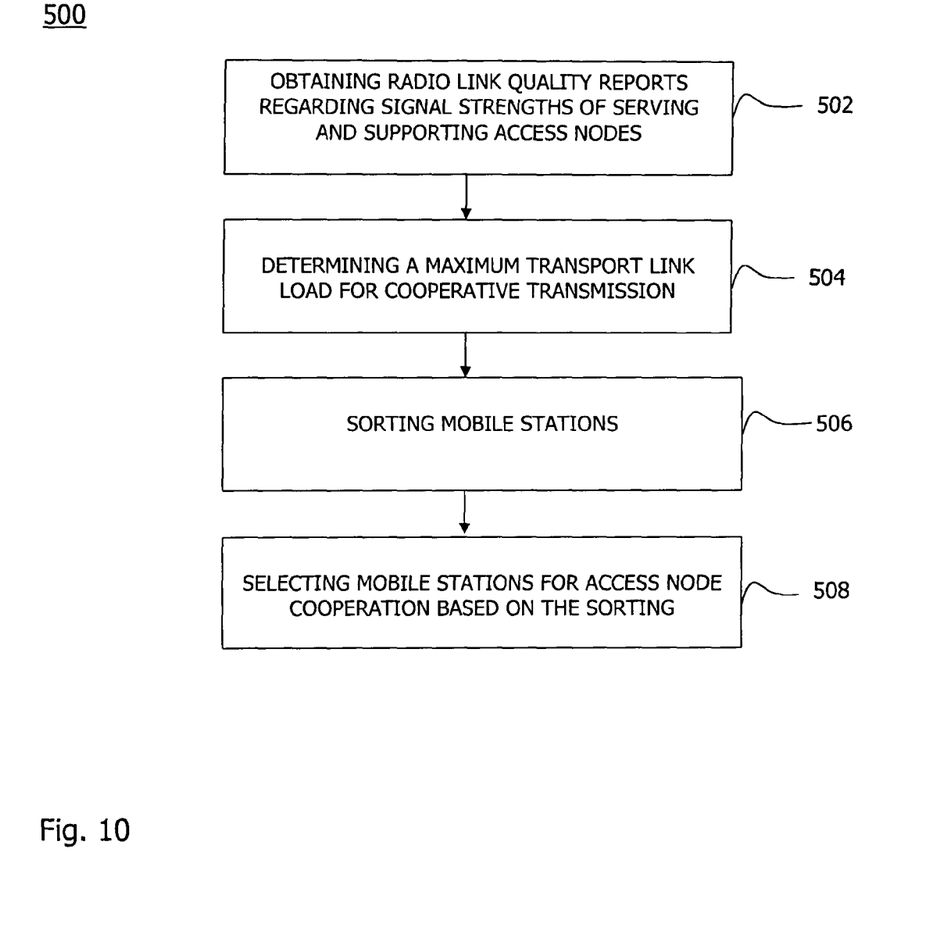
FIG. 10 is a flow chart illustrating a method according to a still further embodiment of the invention.

A further example of a method for instructing a mobile station (i.e., access node cooperation control) is explained with reference to flow chart 500 of FIG. 10. The method may be executed by any access node, e.g. access node BS3' as shown in FIG. 3.

In a first step 502, a serving access node receives radio link quality reports regarding the signal strengths of a serving access node and plurality of supporting access nodes. The radio link quality reports are sent from the mobile stations to the serving access node. The mobile stations may be the mobile stations UE1', UE2' and UE3' shown in FIG. 3. Thereafter, in step 504, the maximum transport link load which can be used for cooperative transmission is determined by the serving access node. In a subsequent step 506, candidate mobile stations for cooperative transmission are sorted in accordance with at least one of the following parameters:

a threshold of difference in signal quality level between the serving access node and a supporting access node, i.e., |RS−R|, whereby a low |RS−RC| indicates a high potential gain through cooperative transmission, RS is the signal strength of the serving access node and RC the signal strength of the cooperating access node;

a parameter relating to the signal quality of the serving access node (e.g., an absolute value of RS, whereby a high value of RS indicates good non-cooperative transmission);

a parameter relating to the QoS and/or the bearer requirements of the mobile station; and a parameter relating to a subscriber profile of the mobile station.

In accordance with the sorting provided in step 506, the serving access node selects in step 508 mobile stations for cooperative transmission.

Each specific access node cooperation technique can be configured with certain parameters which are influencing the access link capacity and the transport link requirement. For example, an access node cooperating with a plurality of access nodes increases the access link capacity, however, the amount of data exchanged between the cooperating access nodes also increases. By limiting the number of cooperating access nodes, the transport link requirements relax. Other parameters that allow influencing the required transport link capacity on the transport links connecting the access nodes are a selection of the number of mobile stations for which cooperative communication (involving multiple access nodes) is applied. Cooperative communication can also be limited to only certain mobile stations, e.g., mobile stations at the edge of a cell, mobile stations requiring a high radio access rate and/or premium (VIP) users. The received mobile station or access node signal power can also be considered.

Figure 11:
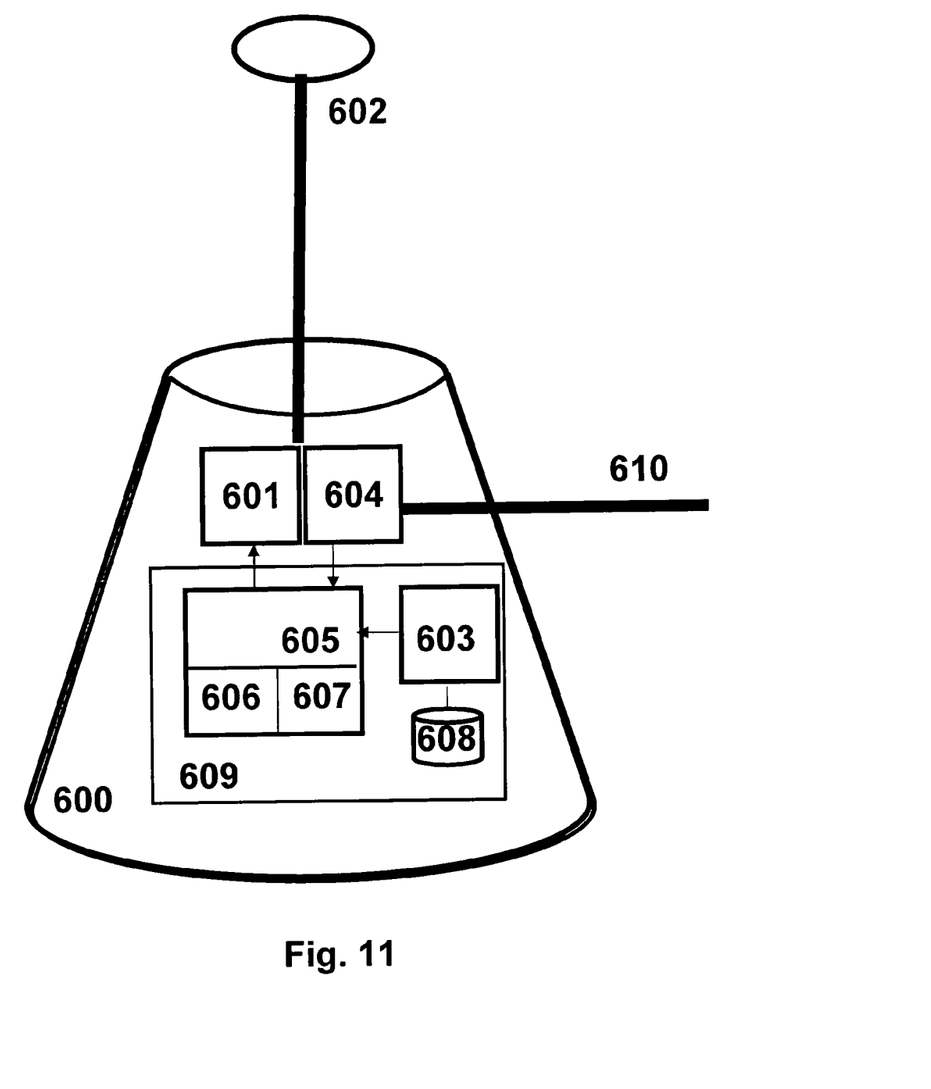
FIG. 11 shows a control device according to the invention.

FIG. 11 shows an embodiment of a control device 600. The control device can be disposed in an access node of the cellular communication system, e.g. in a radio base station or an eNodeB. The access node may be any of the access nodes BS1, BS2, BS3 shown in FIG. 1 or any of the access nodes BS1', BS2', BS3', BS4', BS5' shown in FIG. 3. It is possible that a common control device exists for a base station or for a plurality of base stations or that each sector in a base station is provided with an individual control device.

Control device 600 is adapted for operation in a cellular communication system comprising a plurality of access nodes, and a plurality of mobile stations in a coverage area of the plurality of access nodes. The plurality of access nodes and the plurality of mobile stations are adapted to perform data transmission in a first mode between an individual access node from the plurality of access nodes and the first mobile station, and in a second mode of cooperative data transmission between at least two of the access nodes from the plurality of access nodes and the first mobile station.

An access node, in which control device 600 can be implemented, is generally capable of communicating with at least one mobile station and cooperating with a plurality of supporting access nodes. Control device 600 comprises a transmission interface 601, e.g. an interface unit towards a radio transmitter or an internal transmission system, e.g. a bus, of an access node, for initiating an instruction to a mobile station or an access node to perform data transmission or reception in a selected mode. UL cooperation of access nodes may not require a particular behaviour of the mobile station which may send signals as usual without knowledge in which mode the access nodes operate while in DL, the mobile station may, depending on the implementation of the cooperative transmission, need information if data is sent from several or a single access node. For sending such instructions or information, the transmission interface 601 is connected for example to an antenna 602 or to a link 610 to other access nodes. Similar connections exist also for reception interface 604. For simplicity the figure omits well-known hardware like amplifiers or modulators which adapt the signals for radio or link transmission and reception.

An identification unit 603 is adapted to identify one or more mobile stations in a coverage area of the access node, e.g. based on data stored in a memory 608 registering mobile stations. The reception interface 604 can obtain an indication of a modification of the transmission conditions between the first mode and the second mode for identified mobile station. Reception interface 604 can be for example an internal interface towards a memory of a base station which stores indications for the mobile station or towards processing logic which extracts the data from signals transmitted by the mobile station or by other access nodes or determines the indications based on such signals, e.g. calculates them based on measurement reports or triangulation measurements. A selector 605 is adapted to select the mode of data transmission for the identified mobile station from the first and the second mode based on the indication and provide an information to transmission interface 601 for which mobile stations which mode indication should be sent to the mobile station and/or the respective access nodes.

In further embodiments of the control device, it is also possible that the control device comprises a comparator 606 which compares a total number of selected mobile stations with a threshold for a maximum. It is also often advantageous to sort the mobile stations according to the indications using a sorter 607 so that only those mobile stations for a specific range of the indications can be selected. Selector 605 and an optional sorter 607 or comparator 606 can be implemented together, e.g. in a processor 609 of an access node.

The present technique for selecting mobile stations provides an optimization of cooperative transmission and reception, in particular in situations when the transport link, i.e., the backhaul transport link, or other resources of the serving access node are a limiting factor. Thereby, a higher user and cell throughput and a better utilization of transport network capacities can be provided. Even during network operation, access node cooperation techniques can be changed and/or parameters of a respective access node cooperation technique can be reconfigured.

The above embodiments admirably achieve the objects of the invention. However, it will be appreciated that departures can be made by those skilled in the art without departing from the scope of the invention which is limited only by the claims.

The invention claimed is:

1. A method of data transmission with a first mobile station in a cellular communication system, the cellular communication system comprising a plurality of access nodes, and a plurality of mobile stations in a coverage area of the plurality of access nodes, wherein the plurality of access nodes and the plurality of mobile stations are configured to perform data transmission in a first mode between a single access node from the plurality of access nodes and the first mobile station, and in a second mode of cooperative data transmission between at least two of the access nodes from the plurality of access nodes and the first mobile station, the method comprising:
   identifying the first mobile station from the plurality of mobile stations;
   determining an indication of a modification of the transmission conditions between the first mode and the second mode for said first mobile station, wherein the indication is indicative of a transmission requirement of an application executed in the first mobile station;
   selecting the mode of data transmission for the identified first mobile station from the first mode and the second mode based on the indication;
   performing the data transmission in the selected mode;
   determining a load threshold for mobile stations operating in the second mode; and
   selecting the first mode for the first mobile station if a load associated with all mobile stations operating in the second mode reaches the load threshold.

2. The method according to claim 1, wherein the load threshold is associated with a first access node from the plurality of access nodes.

3. The method according to claim 2, wherein the load threshold is a related to maximum transport link load or a processing resource of the first access node.

4. The method according to claim 1, wherein determining the indication further comprises determining an indication of a modification of the transmission conditions between the first mode and the second mode for multiple ones of the plurality of mobile stations, the method further comprising sorting the multiple ones of the plurality of mobile stations based on the indications, wherein selecting the mode of data transmission further comprises selecting the mode of data transmission for the sorted mobile stations.

5. The method according to claim 1, wherein the indication relates to specific access nodes from the plurality of access nodes, wherein the plurality of access nodes comprises at least one access node at a first location and at least one access node at a further location, and wherein selecting the mode of data transmission further comprises checking if the location of the specific access nodes coincides.

6. The method according to claim 1, wherein the indication comprises a difference in channel quality between the first mobile station and different access nodes from the plurality of access nodes.

7. The method according to claim 1, wherein the indication comprises a difference in a signal propagation delay between the first mobile station and different access nodes from the plurality of access nodes.

8. The method according to claim 7, further comprising comparing the difference in the signal propagation delay to a threshold for the difference in the signal propagation delay adjusted by a multi path propagation delay.

9. The method according to claim 1, wherein the indication comprises a radio link performance between the first mobile station and an access node from the plurality of access nodes.

10. The method according to claim 1, wherein the indication comprises a difference between a throughput of the data transmission for the first mode and a throughput of the data transmission for the second mode.

11. The method according to claim 1, wherein the indication is indicative of a geographical location of the first mobile station.

12. A control device for a cellular communication system comprising a plurality of access nodes, and a plurality of mobile stations in a coverage area of the plurality of access nodes, wherein the plurality of access nodes and the plurality of mobile stations are configured to perform data transmission in a first mode between a single access node from the plurality of access nodes and a first mobile station, and in a second mode of cooperative data transmission between at least two of the access nodes from the plurality of access nodes and the first mobile station, the control device comprising:
  an identification unit for identifying the first mobile station from the plurality of mobile stations;
  a reception interface for obtaining an indication of a modification of the transmission conditions between the first mode and the second mode for said first mobile station, wherein the indication is indicative of a transmission requirement of an application executed in the first mobile station;
  a selector for selecting the mode of data transmission for the identified mobile station from the first mode and the second mode based on the indication, wherein the selector selects the first mode for the first mobile station if a load associated with all mobile stations operating in the second mode reaches a load threshold; and
  a transmission interface for initiating an instruction to perform data transmission in the selected mode.

13. The control device according to claim 12, wherein the control device is disposed in an access node of the cellular communication system.

14. A communication network comprising a control device, the communication network comprising a plurality of access nodes, and a plurality of mobile stations in a coverage area of the plurality of access nodes, wherein the plurality of access nodes and the plurality of mobile stations are configured to perform data transmission in a first mode between a single access node from the plurality of access nodes and a first mobile station, and in a second mode of cooperative data transmission between at least two of the access nodes from the plurality of access nodes and the first mobile station, the control device comprising:
  an identification unit for identifying the first mobile station from the plurality of mobile stations;
  a reception interface for obtaining an indication of a modification of the transmission conditions between the first mode and the second mode for said first mobile station, wherein the indication is indicative of a transmission requirement of an application executed in the first mobile station;
  a selector for selecting the mode of data transmission for the identified mobile station from the first mode and the second mode based on the indication, wherein the selector selects the first mode for the first mobile station if a load associated with all mobile stations operating in the second mode reaches a load threshold; and
  a transmission interface for initiating an instruction to perform data transmission in the selected mode.

15. A non-transitory program unit comprising code comprising instructions for implementing data transmission with a first mobile station in a cellular communication system, the cellular communication system comprising a plurality of access nodes, and a plurality of mobile stations in a coverage area of the plurality of access nodes, wherein the plurality of access nodes and the plurality of mobile stations are configured to perform data transmission in a first mode between a single access node from the plurality of access nodes and the first mobile station, and in a second mode of cooperative data transmission between at least two of the access nodes from the plurality of access nodes and the first mobile station, the code comprising instructions, which when executed by a control device, cause the control device to:
  identify the first mobile station from the plurality of mobile stations;
  determine an indication of a modification of the transmission conditions between the first mode and the second mode for said first mobile station, wherein the indication is indicative of a transmission requirement of an application executed in the first mobile station;
  select the mode of data transmission for the identified first mobile station from the first mode and the second mode based on the indication;
  perform the data transmission in the selected mode;
  determine a load threshold for mobile stations operating in the second mode; and
  select the first mode for the first mobile station if a load associated with all mobile stations operating in the second mode reaches the load threshold.

* * * * *